United States Patent [19]

Marui

[11] Patent Number: 5,562,359
[45] Date of Patent: Oct. 8, 1996

[54] HANDLE STEM FIXING DEVICE IN A BICYCLE

[75] Inventor: Kohei Marui, Kobe, Japan

[73] Assignee: Marui Co., Ltd., Hyogo-ken, Japan

[21] Appl. No.: 311,121

[22] Filed: Sep. 23, 1994

[30] Foreign Application Priority Data

Oct. 5, 1993 [JP] Japan .................... 5-249534

[51] Int. Cl.⁶ .................... B62K 21/00; F16B 17/00
[52] U.S. Cl. .................... 403/378; 403/374; 280/279; 74/551.1
[58] Field of Search .................... 280/280, 279; 74/551.1, 551.2, 551.3, 551.4; 403/374, 371, 370, 378, 367, 365

[56] References Cited

U.S. PATENT DOCUMENTS

| | | | |
|---|---|---|---|
| 379,276 | 3/1888 | Jeffery | 280/279 |
| 516,739 | 3/1894 | Jeffery | 280/279 |
| 607,438 | 7/1898 | Hood | 74/551.1 X |
| 1,174,858 | 3/1916 | Hamilton | 403/378 X |
| 4,274,301 | 6/1981 | Katayama | 403/370 X |
| 4,376,254 | 3/1983 | Hellmann | 403/365 X |
| 4,523,338 | 6/1985 | May | 403/378 X |
| 5,095,770 | 3/1992 | Rader, III | 74/551.1 |
| 5,319,993 | 6/1994 | Chiang | 74/551.1 |

FOREIGN PATENT DOCUMENTS 203535  9/1923  United Kingdom ............. 280/279

*Primary Examiner*—Anthony Knight
*Attorney, Agent, or Firm*—Law Office of Steven M. Rabin, P.C.

[57] ABSTRACT

A handle stem fixing device in a bicycle includes a stem-binding cylinder 30 fitted on an upper portion of a fork stem 10 and a screw cap 4 engaged with an upper portion of the fork stem 10, wherein a thread is formed on an outer surface of the fork stem 10, and the screw cap 4 has a bore with internal thread. The cap 4 can be engaged with the thread of the fork stem when the upper portion of the fork stem 10 projects out from an upper end of the stem-binding cylinder 30. While the screw cap 4 is tightened, the 10 stem-binding cylinder 30 is depressed in an axial direction thereof by the cap 4 and is fixed on the upper portion of the fork stem 10.

7 Claims, 9 Drawing Sheets

5,562,359

HANDLE STEM FIXING DEVICE IN A BICYCLE

FIELD OF THE INVENTION

This invention relates to a handle stem fixing device in a bicycle, and more particularly to a fixing device for fixing the handle stem to a fork stem in a bicycle.

BACKGROUND OF THE INVENTION

FIG. 13 exhibits a prior device for fixing a handle stem. A fork stem 10 provided on a front fork 1 is inserted into a head pipe 20 of a skeleton frame 2. The fork stem 10 is rotatably mounted in the head pipe 20 with the aid of an upper bearing 13 and a lower bearing 14. There is a space between an inner surface of the upper bearing 13 and an outer surface of the fork stem 10. A tapered ring 31 is inserted into the space and functions as a wedge. Thus, the head pipe 20 is kept concentric to the fork stem 10. On the other hand, a handle stem 3 consists of a stem-binding cylinder 30 coupling to the fork stem 10 and an arm 38 projecting approximately horizontally toward a handle bar 356. The binding cylinder 30 has a pair of tightening ears which face each other with a small clearance 72. One tightening ear 70 is perforated by a through hole and the other tightening ear (not illustrated in FIG. 13) is perforated by a threaded hole that forces the through hole. The through hole and the threaded hole are arranged coaxially. A bolt 8 penetrates the through hole and the threaded hole.

The conventional coupling of the front fork 1 and the handle stem 3 to the frame 2 is explained now. The upper bearing 13 and the lower bearing 14 are mounted at both ends of the head pipe 20. And then the fork stem 10 is inserted into the head pipe 20. The top of the fork stem 10 projects out from the upper end of the head pipe 20.

Next, the tapered ring 31 is put on the fork stem and a lower part of the tapered ring 31 is pushed into the space between the outer surface of the fork stem 10 and the inner surface of the upper bearing 13 as a wedge. A ring 33 and the binding cylinder 30 of the handle stem 3 are put on the fork stem 10. A screw cap 4 is engaged with a threaded inner surface 105 formed at the upper end portion of the fork stem 10. The cap has a flange 41 at an outer periphery thereof. When the screw cap 4 is screwed into the fork stem 10, the flange 41 presses the top end of the stem-binding cylinder 30. Thus, the stem-binding cylinder 30 is fixed on the fork stem 10 in the axial direction thereof. At the same time, the ring 33 and the tapered ring 31 are forced down by the binding cylinder 30, and the tapered ring 31 is pushed into the space between the outer surface of the fork stem 10 and the inner surface of the upper bearing 13. Thereby the upper bearing 13 is kept concentric to the fork stem 10. The upper and lower bearings 13, 14 are not shaky because they are pushed down by the tapered ring 31 and the head pipe 20.

Finally, when the bolt 8 threadedly engaging the threaded hole through the through hole is tightened, the clearance 72 between the tightening ears decreases. As a result, the diameter of the stem-binding cylinder 30 becomes smaller. Therefore, the outer surface of the fork stem 10 is pressed by the inner surface of the stem-binding cylinder 30. In other words, the stem-binding cylinder 30 is fixed on the fork stem 10 so that the binding cylinder 30 cannot rotate on the fork stem 10.

In the aforementioned prior device, however, it is difficult to know whether a difference between heights of the top faces of the stem-binding cylinder 30 and the fork stem 10 is within the limits of a proper value for tightening the screw cap 4, before the screw cap 4 is screwed into the fork stem 10.

The problem will be explained in detail.

The difference is determined by measurements of the fork stem 10, head pipe 20, the upper and lower bearing 13, 14, the tapered ring 31 and so on. The difference between the heights of the top faces of the stem-binding cylinder 30 and the fork stem 10 is changed by errors of the measurements of the different parts. Furthermore, the difference is considerably changed by an accumulation of measurement errors. When the stem-binding cylinder 30 protrudes from the top face of the fork stem 10 to such an extent that a thread 42 of the screw cap 4 cannot engage with the threaded inner surface 105 of the fork stem 10, the stem-binding cylinder 30 cannot be fixed on the fork stem 10 by the screw cap 4. In this case, the difference between the heights of the top faces of the binding cylinder 30 and the fork stem 10 can be adjusted by removal of the ring 33.

However, it is difficult to measure the difference between the heights of the top faces of the stem-binding cylinder 30 and the fork stem 10 with a ruler before the cap 4 is screwed into the fork stem 10. Therefore, it is impossible to know whether the difference is suitable to screw the cap 4 and the fix the stem-binding cylinder 30 on the fork stem 10 before the screw cap 4 is mounted. Then under existing conditions, there is no alternative but to try to screw the cap 4 into the fork stem 10, excepting in the unusual case that the difference between the heights of both top faces can be seen at first sight. And when the thread 42 of the screw cap 4 cannot engage with the threaded inner surface 105 of the fork stem 10, the difference must be adjusted by removal of the ring 33. When a reasonable difference cannot be obtained even if the ring 33 is eliminated, the handle stem 10 and the front fork 1 must be exchanged for another and an assembly operation must be started over again.

This is why the assembly operation for the handle stem 3 cannot proceed smoothly.

A purpose of this invention is to provide a handle stem fixing device for a bicycle in which it can be confirmed whether the difference between heights of the top faces of the stem-binding cylinder 30 and the fork stem 10 is within the limits of a proper value for tightening the screw cap 4 into the fork stem 10.

SUMMARY OF THE INVENTION

The handle stem fixing device in a bicycle of this invention comprises a fork stem rotatably inserted into a head pipe of a bicycle frame, and has an upper portion of which projects out from an upper end of the head pipe, a thread formed at an outer surface of the upper portion of the fork stem, and a stem-binding cylinder. An inner surface of the stem-binding cylinder presses an outer surface of the fork stem. A screw cap having a bore with an internal thread is provided to be engaged with the thread of the fork stem. A bottom face of the screw cap presses the stem-binding cylinder downwards by tightening thereof.

The functions of this invention will be explained now.

When the handle stem is attached to the frame, in the same way as the conventional coupling, the fork stem penetrates the stem-binding cylinder and the threaded upper portion of the fork stem projects out from the upper end of the stem binding cylinder. And in this state, the screw cap is engaged with the thread of the fork stem. As the screw cap is tightened, the stem-binding cylinder is pushed down by a bottom face of the screw cap. Thus, the handle stem can be pressed and fixed in an axial direction.

When the upper portion of the fork stem projects from the stem-binding cylinder, the screw cap can be engaged with the upper portion of the fork stem. If the upper portion of the fork stem does not project out from the stem-binding cylinder, the cap cannot be tightened. Accordingly, it is possible to confirm at first sight whether or not the cap can be used for coupling of the fork stem and the stem-binding cylinder.

The advantage of this invention is as follows.

Since it is possible to conclude at first sight whether the screw cap can be engaged with the fork stem, there is no need to attempt engagement of the screw caps with the fork stems one-by-one if the fork stem does not protrude from the stem-binding cylinder. Namely, the binding cylinder can be fixed on the upper portion of the fork stem with a high degree of efficiency.

DETAILED DESCRIPTION OF THE PREFERRED EMBODIMENTS

Embodiments of this invention are explained with reference to the figures.

Figure 1:
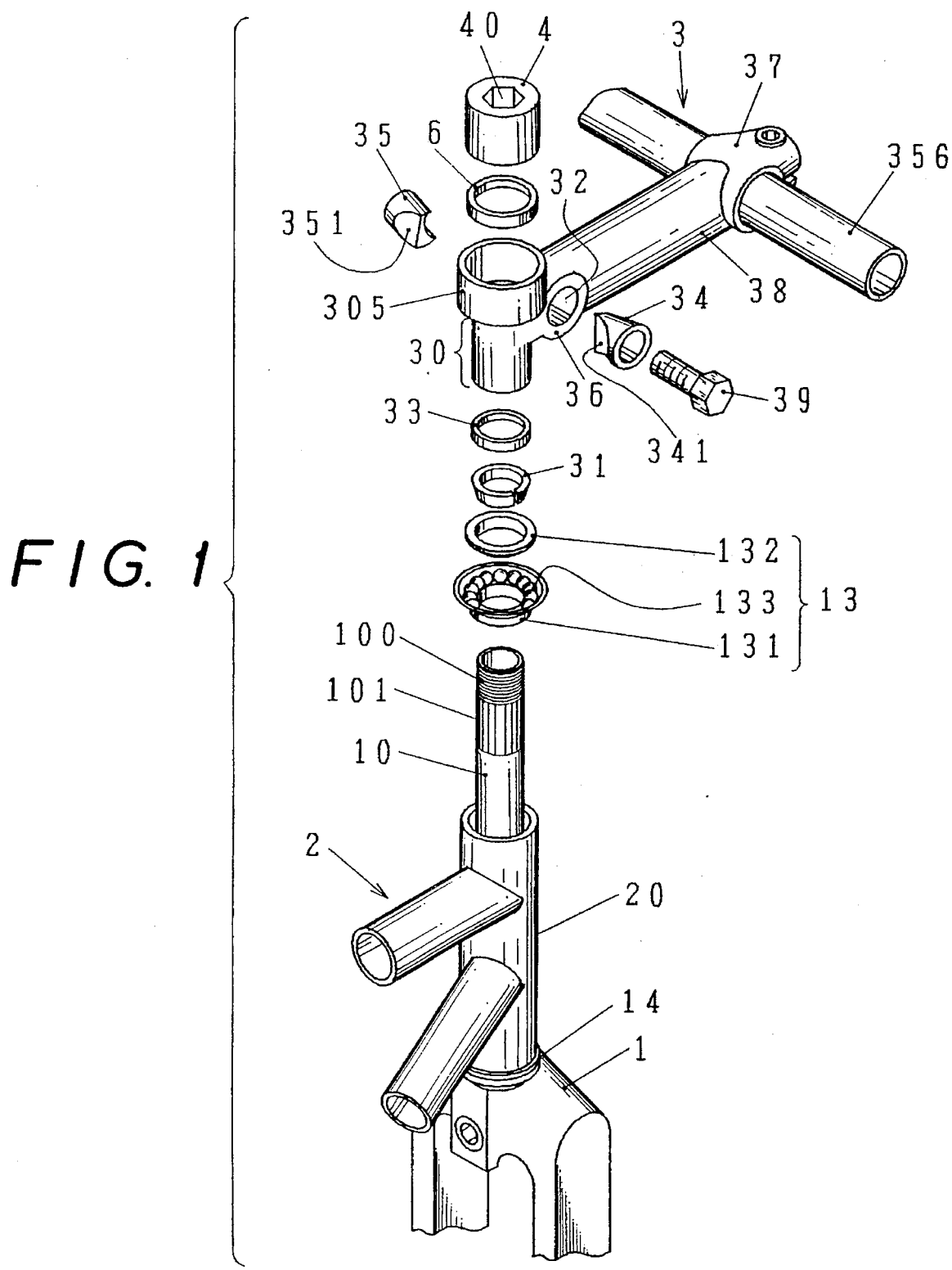
FIG. 1 is an exploded perspective view of a fork stem, stem-binding cylinder and other parts for coupling according to an embodiment of this invention.
Figure 2:
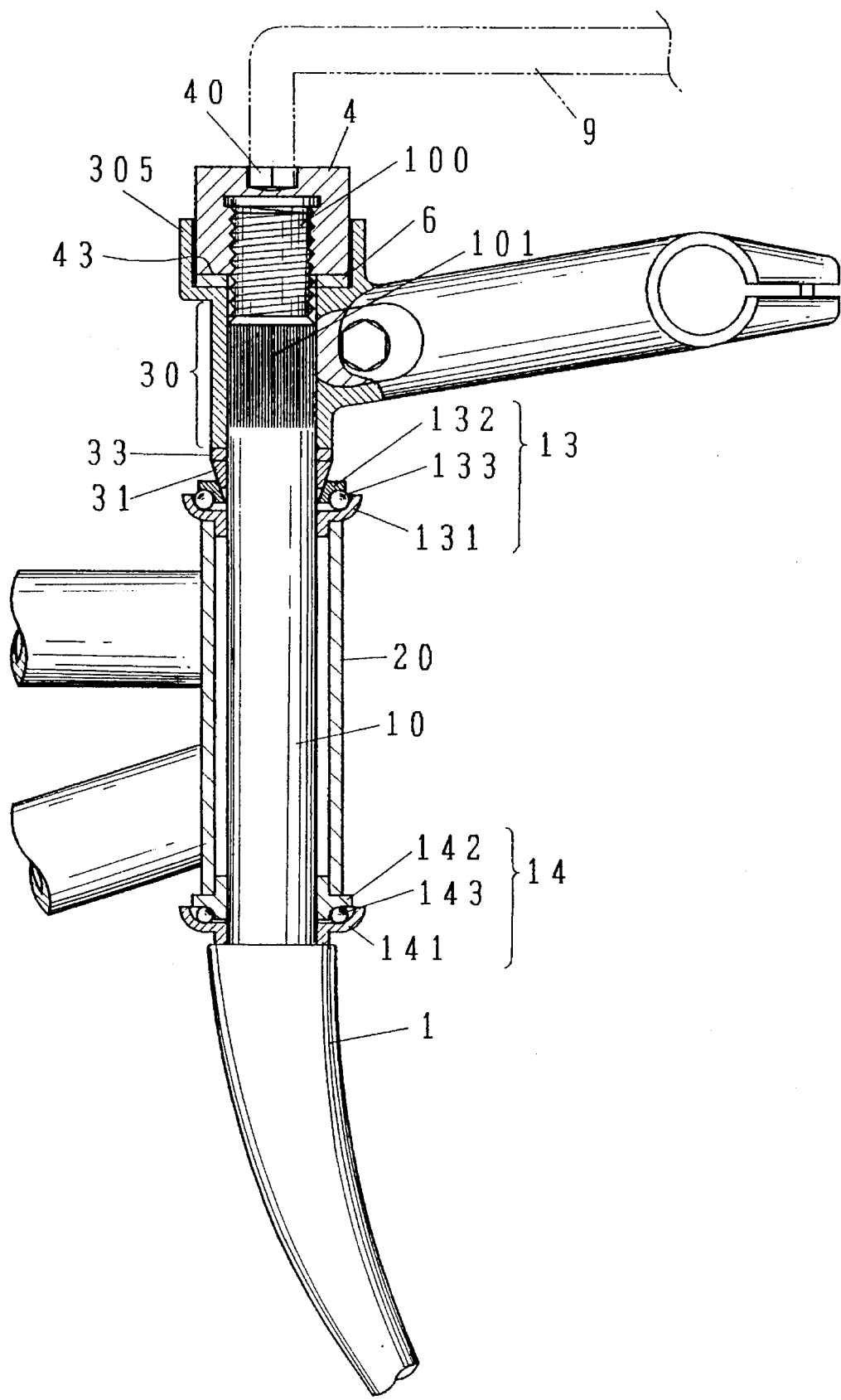
FIG. 2 is a longitudinal sectional view of the stem-binding cylinder fixed on the fork stem.

In this embodiment, a fork stem 10 is provided on a front fork 1 and inserted into a head pipe 20, as shown in FIG. 1. A thread 100 is formed on an outer surface of an upper potion of the fork stem 10. The fork stem 10 is inserted into a stem-binding cylinder 30 of a handle stem 3 so that the thread 100 projects out from the upper end of the stem-binding cylinder 30, as shown in FIG. 2. A screw cap 4 which has a bore with internal thread is engaged with the thread 100. The stem-binding cylinder 30 is fixed on the fork stem 10 in an axial direction thereof by tightening of the screw cap 4.

Figure 10:
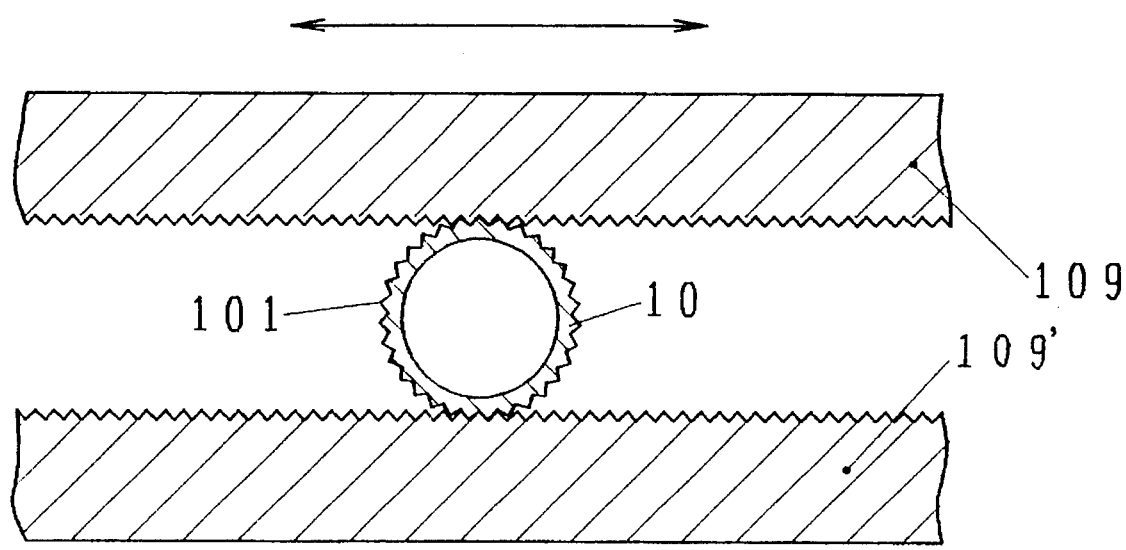
FIG. 10 is a sectional view of a knurling tool.

A part of the outer surface of the fork stem 10 below the thread 100 is knurled surface 101, which provides many small protrusions in the form of many ribs which are parallel to the axial direction of the fork stem and the distance between adjacent ribs, from peak to peak, is 1 mm to 4 mm. The knurled surface 101 can be formed by knurling tools having notched surfaces. As shown in FIG. 10, the knurling tools 109, 109' face each other and the facing surfaces thereof are the notched surfaces. The upper portion of the fork stem, where the knurled surface 101 will be formed, is laid between the knurling tools 109, 109'. The notched surfaces press the outer surface of the fork stem and the upper knurling tool 109 is reciprocated with respect to the fixed lower knurling tool 109'. Therefore, the knurled surface 101 can be made on the outer surface of the fork stem 10, according to the notched surfaces of the knurling tools.

An upper bearing 13 is mounted at the upper end of the head pipe 20 and a lower bearing 14 is mounted at the lower end of the head pipe 20, for supporting the fork stem 10 rotatably. The upper bearing 13 consists of a top ball head cup 131, balls 133, and a screwed ball race 132 for preventing escape of the balls. The lower bearing 14 consists of a bottom ball head cup 141, balls 143 and a crown ball race 142 (see FIG. 2). A tapered ring 31 is put on the screwed ball race 132. The tapered ring 31 has a tapered side surface and a C-shaped horizontal section.

On the other hand, the handle stem 3 consists of a bar-binding cylinder 37 and an arm 38 which is connected to a stem-binding cylinder 30 and which holds a handle bar 356, as shown in FIG. 1.

The inner diameter of the stem-binding cylinder 30 almost corresponds to the outer diameter of the fork stem 10. A cylindrical head 305 is provided on the top of the stem-binding cylinder 30 for receiving the screw cap 4. The outer diameter of the cylindrical head 305 is larger than that of the stem-binding cylinder 30. And the cylindrical head 305 is concentric with the stem-binding cylinder 30.

Figure 3:
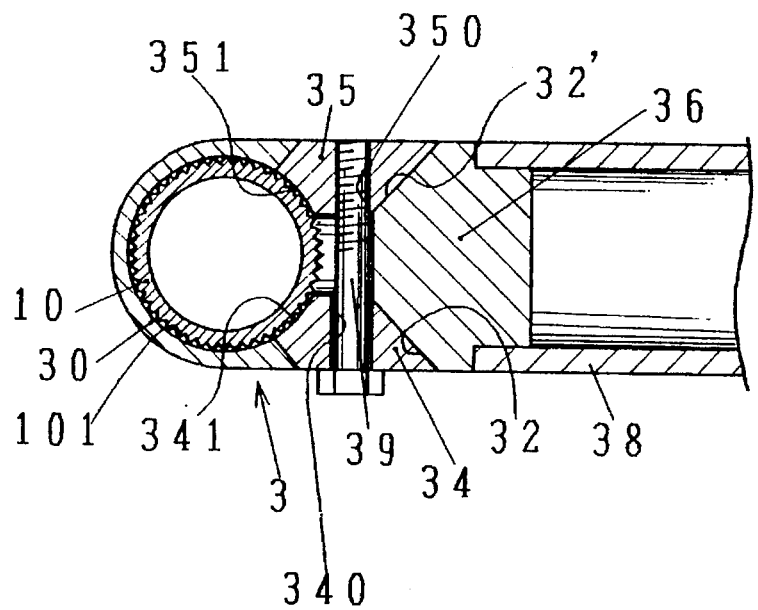
FIG. 3 is a transverse sectional view of the stem-binding cylinder, the fork stem and skew blocks.

The arm 38 has an end portion which is connected to the stem-binding cylinder 30 as one body, as shown in FIG. 1 and FIG. 3. The arm 38 includes a member 36 at its end portion. The end portion 36 of the arm 38 has two slanting holes 32, 32' whose central axes run toward the center of the stem-binding cylinder 30.

A pair of skew blocks 34, 35 are put into the slanting holes, 32, 32'. A through hole 340 perforates the block 34 and a threaded hole 350 perforates the block 35. A tightening bolt 39 passes through the through hole 340 and then is screwed into the threaded hole 350.

The screw cap 4 is a nut having a hexagonal socket head 40.

Next, an operation for fitting the handle stem 3 to the bicycle frame 2 will be explained. First, the stem-binding cylinder 30 must be fixed to the fork stem 10 in the axial direction thereof. The lower bearing 14 is put on a lower end of the fork stem 10 first and then the fork stem 10 is inserted into the head pipe 20 of the frame 2. The upper portion of the fork stem 10 is projected out from the upper end of the head pipe 20. And the upper bearing 13, tapered ring 31 and the ring 33 are put on the projecting upper portion of the handle stem 10 in this mentioned order. Furthermore, the stem-binding cylinder 30 of the handle stem 3 is fitted on the fork stem 10. Then, as shown in FIG. 2, the fork stem 10 penetrates the stem-binding cylinder 30 and the upper portion having the thread 100 of the fork stem 10 projects out into the cylindrical head 305 formed on the stem-binding cylinder 30. If the thread 100 projects out into the cylindrical head 305, the cap 4 can engage therewith via a washer 6 by a hexagonal wrench key 9. On the contrary, if the upper portion having the thread 100 does not project out into the cylindrical head 305, the ring 6 must be removed so that the thread 100' of the fork stem 10 can project out into the cylinder 305. Thus, it is easy to confirm whether the cap 4 can be fitted on the thread 100 of the fork stem 10 and be tightened.

Therefore, the bottom face 43 of the cap 4 presses the top face of the stem-binding cylinder 30 by tightening of the cap 4. Then, as explained with respect to the prior art device, the bottom face of the stem-binding cylinder 30 presses the tapered ring 31 so that the tapered ring 31 will be pushed into a space between the outer surface of the fork stem 10 and the inner surface of the screwed ball race 132, as if it were a wedge. Thereby, the upper bearing 13, the lower bearing 14 and the head pipe 20 are kept concentric to the fork stem 10. And the upper and lower bearings 13, 14 do not shake because these bearings are pushed down by the stem-binding cylinder 30.

Thus, the stem-binding cylinder 30 of the handle stem 3 is fixed to the fork stem 10 so that the fork stem 10 cannot move in the axial direction. Next, how the handle stem 3 is fixed to the fork stem 10 so that the stem-binding cylinder 30 cannot rotate on the fork stem 10 will be explained. lower bearing 14 and the head pipe 20 are kept concentric to the fork stem 10. And the upper and lower bearings 13, 14 do not shake because these bearings are pushed down by the stem-binding cylinder 30.

Thus, the stem-binding cylinder 30 of the handle stem 3 is fixed to the fork stem 10 so that the fork stem 10 cannot move in the axial direction. Next, how the handle stem 3 is fixed to the fork stem 10 so that the stem-binding cylinder 30 cannot rotate on the fork stem 10 will be explained.

The skew blocks 34, 35 are inserted into the respective slanting holes 32, 32' of the member 36 formed at the boundary portion between the stem-binding cylinder 30 and the arm 38. In this state, the through hole 340 and the threaded hole 350 lie straight along a line. The bolt 39 penetrates the through hole 340 and screws into the threaded hole 350. The skew blocks 34, 35 approach each other, while sliding into the slanting holes 32, 32' toward an opening in the stem-binding cylinder 30. Thus, partial cylindrical curve surfaces 341, 351 of the skew blocks 34, 35 press against the knurled surface 101 formed on the outer surface of the fork stem 10. In other words, the knurled surface 101 of the fork stem 10 is pressed by the stem-binding cylinder 30 and the partial cylindrical curve surfaces 341, 351. The coefficients of friction of the contact surfaces between the fork stem and the stem-binding cylinder, and between the fork stem and the partial cylindrical curve surfaces 341, 351 of the skew blocks 34, 35, is relatively large and therefore the frictional binding force acting between the contact surfaces is also relatively large. Accordingly, the fork stem 10 and the skew blocks 34, 35 are firmly fixed so that the stem-binding cylinder 30 cannot rotate on the fork stem 10.

Figure 4:
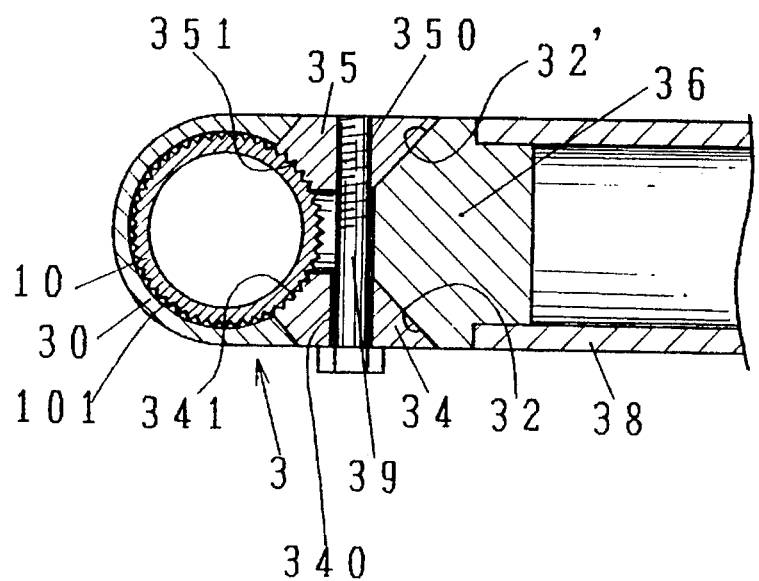
FIG. 4 is a transverse sectional view of the stem-binding cylinder, the fork stem and skew blocks of another embodiment.

Several parts in the above mentioned embodiment can be changed as follows:

As illustrated in FIG. 4, small protrusions such as ribs formed by knurling may also be provided on the partial cylindrical curve surfaces 341, 351 of the skew blocks 34, 35 so as to engage with the outer surface of the fork stem. In this state, the ribs of the skew blocks fit into spaces between the adjacent ribs formed on the fork stem 10. Accordingly, the binding force between the fork stem 10 and the stem-binding cylinder 30 increases even more. So, the binding cylinder 30 is fixed on the fork stem 10 firmly.

Figure 9:
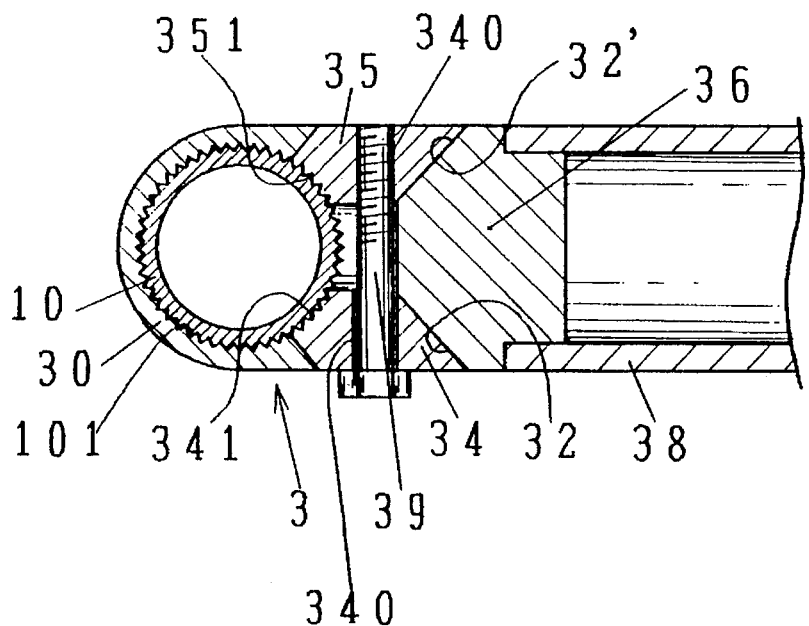
FIG. 9 is a transverse sectional view of the stem-binding cylinder, the fork stem and skew blocks of a sixth embodiment.

And as shown in FIG. 9, the stem-binding cylinder 30 has small protrusions such as ribs by knurling at the inner surface thereof so as to coincide with the knurled surface 101 of the fork stem 10. The many ribs can be formed at the inner surface of the stem-binding cylinder 30 by inserting a columnar knurling tool having a notched outer surface into the stem-binding cylinder 30 by force.

Figure 5:
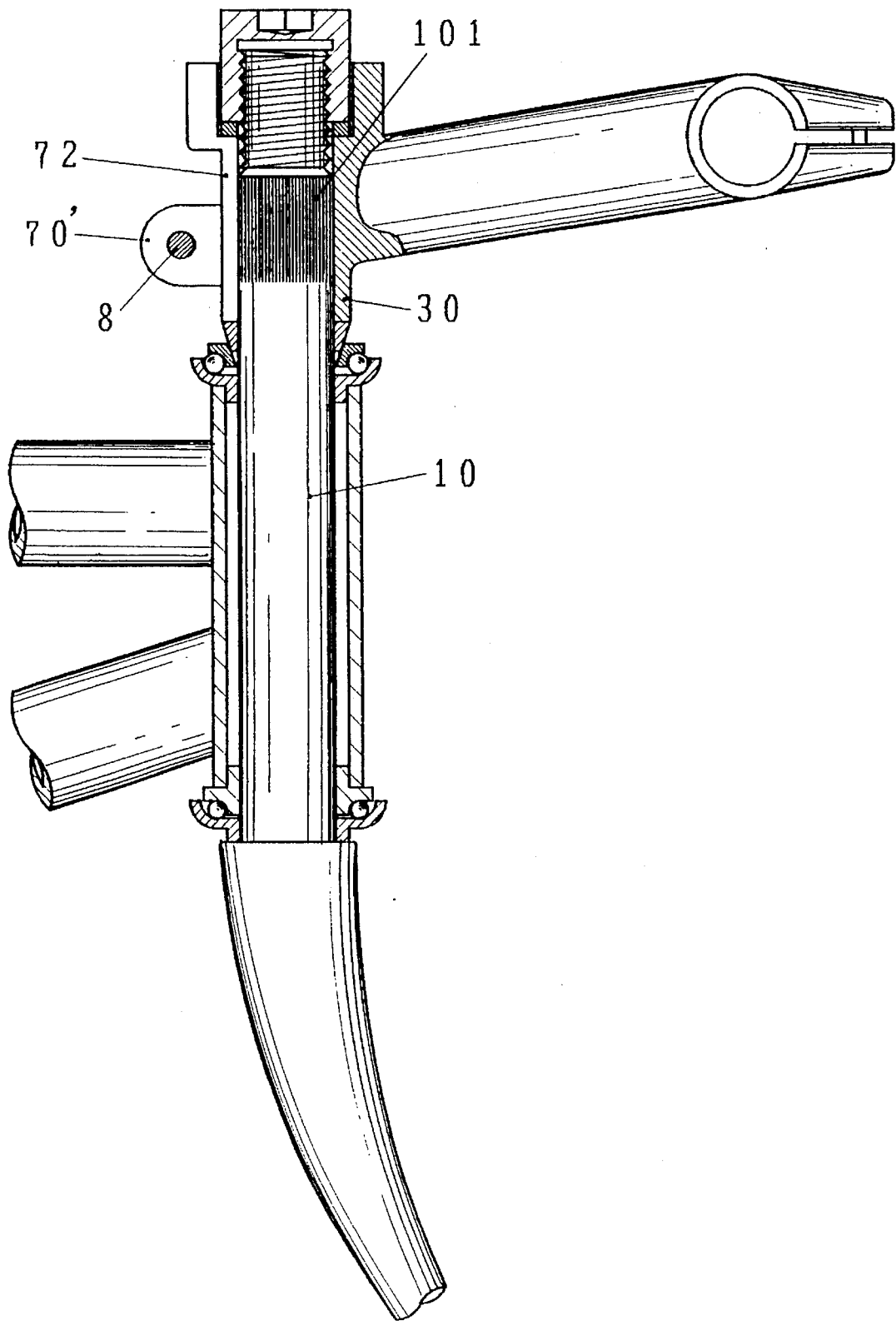
FIG. 5 is a longitudinal sectional view of the stem-binding cylinder fixed on the fork system according to a third embodiment.
Figure 6:
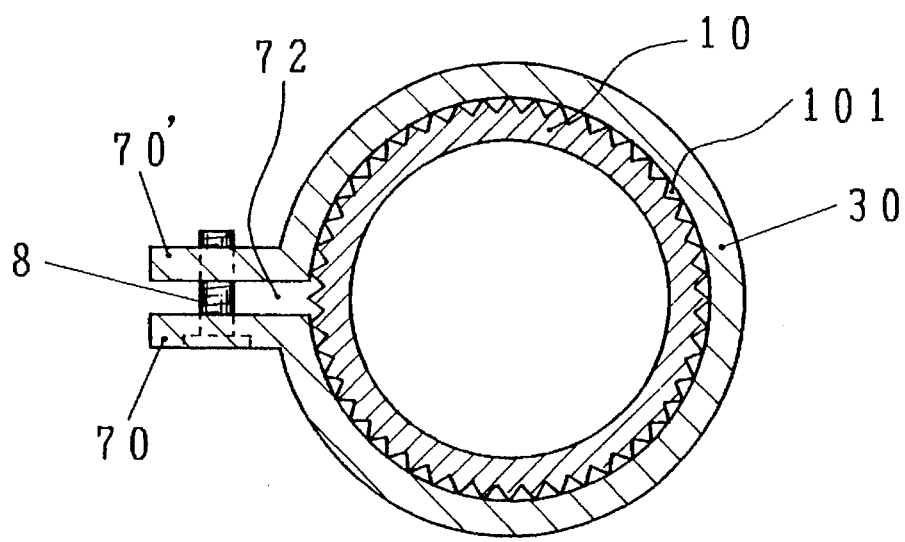
FIG. 6 is a transverse sectional view of the stem-binding cylinder and the fork stem of the third embodiment.
Figure 7:
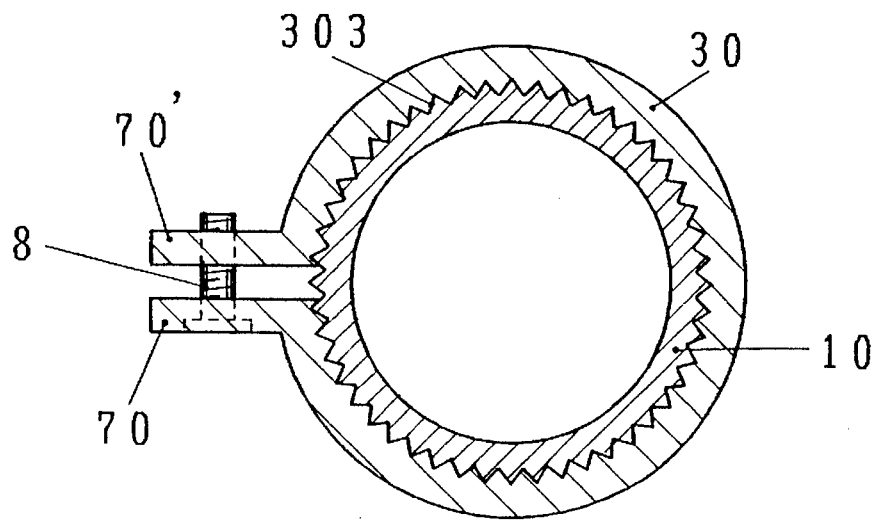
FIG. 7 is a transverse sectional view of the stem-binding cylinder and the fork stem according to a fourth embodiment.

As shown in FIG. 5 and FIG. 6, the stem-binding cylinder 30 may have tightening ears 70, 70' which face each other with a small clearance 72, as in the conventional coupling. The tightening ears 70, 70' are perforated by holes extending a direction normal thereto. The hole in the tightening ear 70 is a through hole and the other hole in the tightening ear 70' is a threaded hole. The fork stem 10 is inserted into the inner opening of the binding cylinder 30. A bolt 8 penetrates the hole in the tightening ear 70 and is screwed into the threaded hole in the tightening ear 70'. As the bolt 8 is screwed into the threaded hole, the clearance 72 decreases and the inner diameter of the stem-binding cylinder 30 also decreases. As a result, the inner surface of the stem-binding cylinder 30 is strongly bound to the fork stem 10 by a frictional binding force. In this case, as shown in FIG. 7, it goes without saying that the binding cylinder 30 can be bound to the fork stem 10 still more strongly when a knurled surface 303 is formed on the inner surface of the binding cylinder 30.

Figure 8:
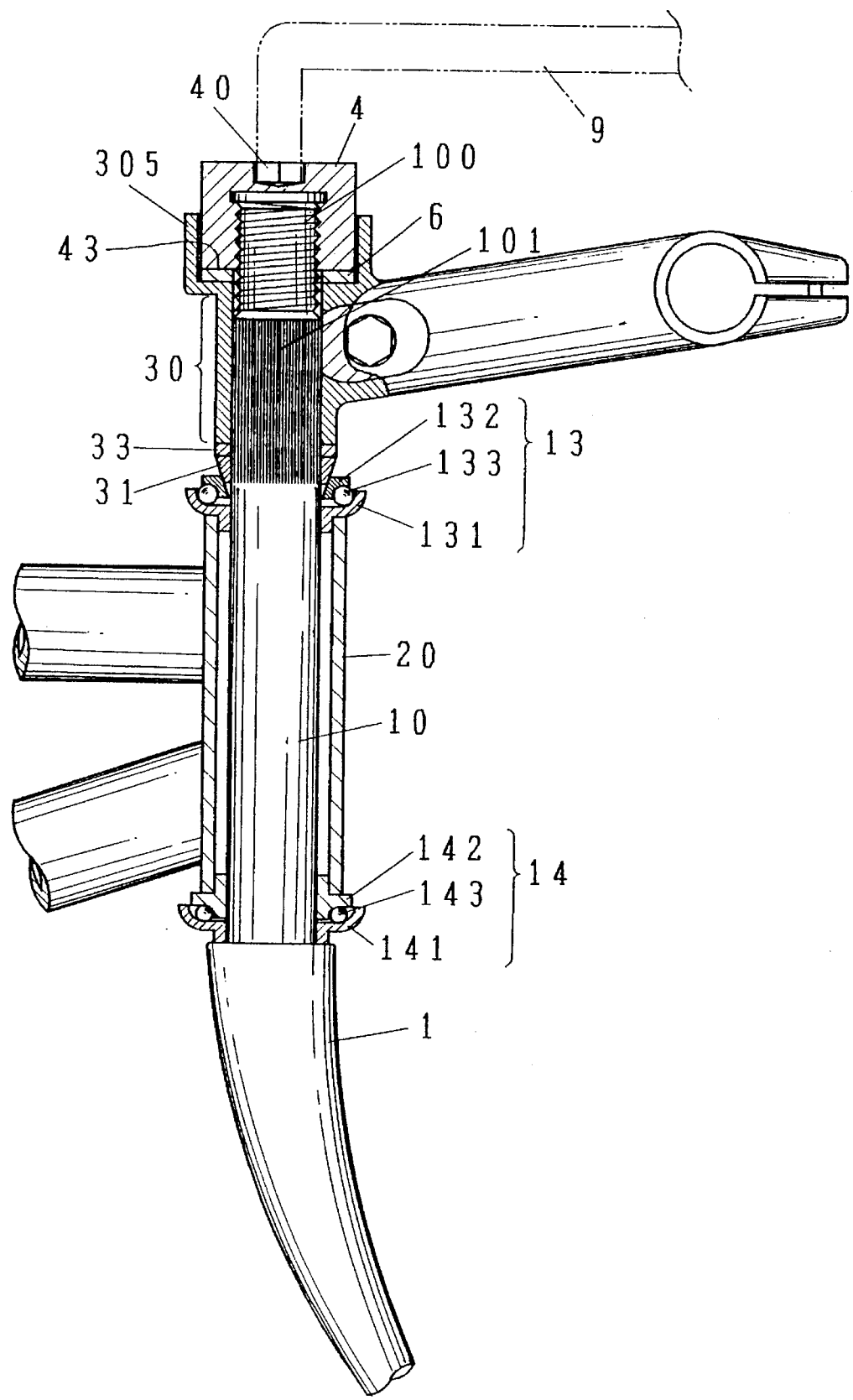
FIG. 8 is a longitudinal sectional view of the stem-binding cylinder fixed on the fork stem accordingly to a fifth embodiment.

Furthermore, as shown in FIG. 8, the knurled surface 101 may be extended down below to a position where the tapered ring 31 is inserted into the space between the fork 10 and the upper bearing 13. In this state, even if the screw cap 4 becomes loose and the fixing force in the axial direction is gone, the binding force of the stem-binding cylinder 30 to the fork stem 10 is not loosened, because the tapered ring 31 like a wedge presses against the knurled surface 101 of the fork stem 10 with stability. Accordingly, a backlash on the upper bearing 13 can be prevented.

Figure 11:
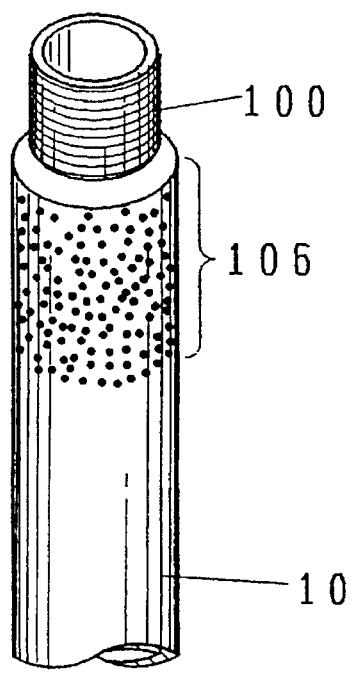
FIG. 11 is a perspective view of a fork stem having a shot blasted surface.

The knurled surface in the above mentioned embodiments has many ribs which are parallel to the axial direction. However, a knurled surface having a crisscross pattern can be used. And the rough surface 106 may be formed by shotblast without the knurling process, as shown in FIG. 11.

Figure 12:
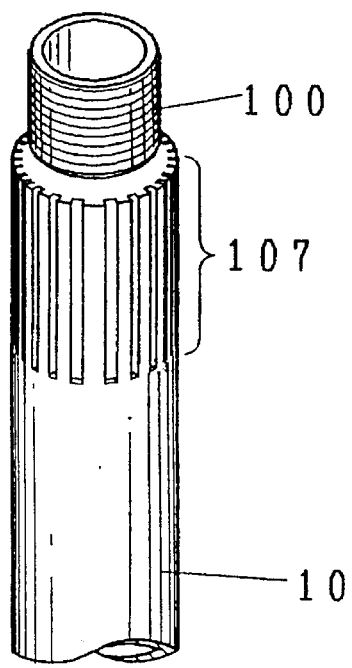
FIG. 12 is a perspective view of a fork stem having slots.
Figure 13:
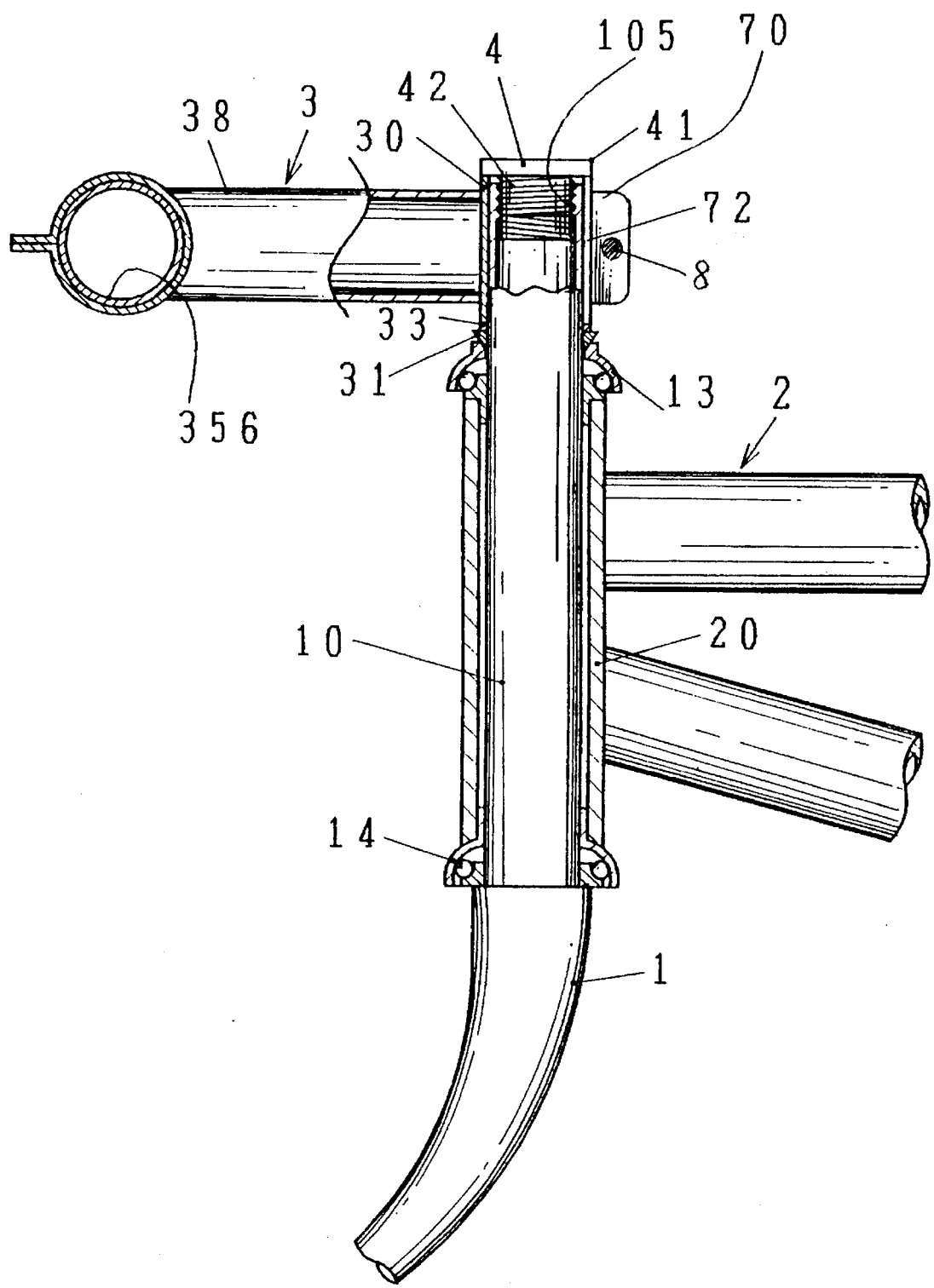
FIG. 13 is a longitudinal sectional view of the stem-binding cylinder fixed on the fork stem according to the prior art.

Furthermore, as shown in FIG. 12, in addition to the knurling process, by carving many slots, long and slender grooves 107 can be formed. The shotblasted surface or the many grooves may be also formed on the inner surface of the stem-binding cylinder 30 or on the partial cylindrical curved surfaces 341, 351 of the skew blocks 34, 35.

What is claimed is:

1. A handle stem fixing device for a bicycle, comprising:

an axially extending head pipe having an upper end;

a fork stem rotatably mounted in said head pipe said fork stem having an upper portion projecting from said upper end of the head pipe, said upper portion of said fork stem having an upper end, said upper end of said upper portion of said fork stem having a threaded outer surface;

a stem-binding cylinder mounted on the upper portion of the fork stem, said stem-binding cylinder having a top end;

a cylindrical head on said top end of said stem-binding cylinder, said upper end of said upper portion of said fork stem projecting from said top end of said stem-binding cylinder into said cylindrical head; and a cylindrical screw cap having an internal thread threadedly engaged with the threaded outer surface of said upper end of said upper portion of the fork stem and having a block-shaped lower end that presses down on the top end of the stem-binding cylinder so as to press the stem-binding cylinder downward in an axial direction when the cap is received in said cylindrical head and screwed onto the upper end of the upper portion of said fork stem.

2. A handle stem fixing device for a bicycle as claimed in claim 1, wherein a large number of small protuberances are formed on an outer surface of the fork stem, the stem-binding cylinder has tightening ears which face each other with a small clearance, the tightening ears are perforated by holes extending a direction normal thereto, a bolt penetrates the holes in the tightening ears, and an inner diameter of the stem-binding cylinder decreases as the bolt is tightened.

3. A handle stem fixing device for a bicycle as claimed in claim 1, wherein the screw cap has a hexagon socket head.

4. A handle stem fixing device for a bicycle as claimed in claim 1, wherein said stem-binding cylinder has a first interior cylindrical surface having a first interior diameter and said cylindrical head has a second interior cylindrical surface having a second interior diameter greater than the first interior diameter, said top end of said stem-binding cylinder extends radially between said first and second interior cylindrical surfaces, and said lower end of said cap has a disk-shaped face opposing said top end of said stem-binding cylinder below said internal thread of said cap.

5. A handle stem fixing device for a bicycle, comprising:

a head pipe, a fork stem rotatably mounted in said head pipe, said fork stem having an upper portion projecting from said upper end of the head pipe, said upper portion of said fork stem having an outer surface, said outer surface having a large number of small protrusions formed thereon, a stem-binding cylinder mounted on the upper portion of the fork stem, an extension formed on the stem-binding cylinder, a pair of slanting holes penetrating the extension in such a direction that they meet at an opening of the stem-binding cylinder, a pair of skew blocks fitted in the slanting holes, and bolt means for tightening the skew blocks by urging said skew blocks so as to slide into the slanting holes and approach each other.

6. A handle stem fixing device for a bicycle, comprising:

an axially extending head pipe having an upper end;

a fork stem rotatably mounted in said head pipe, said fork stem having an upper portion including in upper end, projecting from said upper end of the head pipe, said upper portion of said fork stem having a first outer surface, said first outer surface having a large number of small protrusions, said upper end of said upper portion of said fork stem having a threaded second outer surface;

a stem-binding cylinder mounted on the upper portion of the fork stem, said stem-binding cylinder having a top end, said upper end of said upper portion of said fork stem projecting from said top end of said stem-binding cylinder;

an extension formed on the stem-binding cylinder, a pair of slanting holes penetrating the extension in such a direction that they meet at an opening of the stem-binding cylinder;

a part of skew blocks fitted in the slanting holes;

bolt means for tightening the skew blocks by urging the skew blocks so as to slide into the slanting holes and approach each other; and a screw cap having an internal thread threadedly engaged with the threaded outer surface of said upper end of said upper portion of the fork stem, said screw cap pressing said stem-binding cylinder downward in an axial direction when said screw cap is screwed onto the upper end of the upper portion of said fork stem.

7. A handle stem fixing device for a bicycle as claimed in claim 7, wherein a cylindrical head is provided on a top of the stem-binding cylinder for receiving the screw cap.

* * * * *